(12) United States Patent
Moore et al.

(10) Patent No.: US 6,190,159 B1
(45) Date of Patent: Feb. 20, 2001

(54) METHOD AND APPARATUS FOR REDUCING NITROUS OXIDES AND CO EMISSIONS IN A GAS-FIRED RECUPERATED RADIANT TUBE BURNER

(75) Inventors: Edward E. Moore, Hummelstown; Raymond F. Baum, Lebanon; Brian K. Kelly, Harrisburg, all of PA (US)

(73) Assignee: Hauck Manufacturing Company, Lebanon, PA (US)

(*) Notice: Under 35 U.S.C. 154(b), the term of this patent shall be extended for 0 days.

(21) Appl. No.: 09/261,235

(22) Filed: Mar. 3, 1999

(51) Int. Cl.[7] .............................. F23D 21/00; F23C 9/00; F23C 11/00
(52) U.S. Cl. ........................ 431/11; 431/115; 431/215; 126/91 A
(58) Field of Search .................... 431/11, 215, 115, 431/116; 126/91 A, 91 R, 209; 432/180, 199, 175

(56) References Cited

U.S. PATENT DOCUMENTS

| | | | |
|---|---|---|---|
| 1,295,085 | * 2/1919 | Eddison | 431/12 |
| 1,466,356 | * 8/1923 | Eddison | 431/12 |
| 4,359,209 | 11/1982 | Johns . | |
| 4,800,866 | 1/1989 | Finke . | |
| 4,828,483 | 5/1989 | Finke . | |
| 5,775,317 | 7/1998 | Finke . | |

FOREIGN PATENT DOCUMENTS

| | | | |
|---|---|---|---|
| 0069932 | * 6/1978 | (JP) | 126/91 A |
| 0012904 | * 2/1981 | (JP) | 431/115 |
| 0167621 | * 9/1984 | (JP) | 431/215 |
| 0011202 | * 1/1991 | (JP) | 431/115 |
| 4-106305 | * 4/1992 | (JP) | 431/115 |
| 467119 | * 7/1975 | (SU) | 432/209 |
| 0580233 | * 11/1977 | (SU) | 432/209 |

* cited by examiner

*Primary Examiner*—Carl D. Price
(74) *Attorney, Agent, or Firm*—Evenson, McKeown, Edwards & Lenahan, P.L.L.C.

(57) ABSTRACT

A radiant tube burner assembly and method is provided to reduce nitrous oxides and carbon monoxide emissions in the combustion of hydrocarbon fuels. The burner assembly comprises a burner section, exhaust section, radiant tube, plenum and a jet pump assembly. A volume of exhaust gas drawn from the stream of exhaust gases into the jet pump assembly by way of a motive gas is flowed into a stream of combustion air so as to vitiate the oxygen content of the combustion mixture. When the combustion mixture is combusted with fuel in the burner section, the production of nitrous oxides and other harmful emission is mitigated.

13 Claims, 4 Drawing Sheets

METHOD AND APPARATUS FOR REDUCING NITROUS OXIDES AND CO EMISSIONS IN A GAS-FIRED RECUPERATED RADIANT TUBE BURNER

BACKGROUND OF THE INVENTION

The present invention relates generally to radiant tube burners, and more specifically, to radiant tube burners which vitiate the oxygen content of combustion air with re-circulated flue gas so as to minimize nitrous oxides ($NO_x$) sufficiently and to allow the flue gas to be thoroughly mixed with the combustion air to reduce CO emissions. This invention further relates to methods for reducing the formation of nitrous oxides in a radiant tube burner assembly. Specifically, this invention relates to a method of reducing nitrous oxide and carbon monoxide emission levels by recirculating flue gases into the combustion air mixture and thoroughly mixing them prior to combustion.

The mechanism of combustion is not fully understood even today, and different burner assemblies have varying degrees of success at lowering nitrous oxides and after harmful emissions. There is a measure of unpredictability to this field which exacerbates the ever present and critical need for new methods or technologies which more efficiently and effectively minimize $NO_x$ emissions and other waste products for a radiant tube burner assembly. This need is critical because much of the energy required by industry comes from the combustion of hydrocarbons, and older methods and devices do not satisfy new government regulations. As political pressure continues to drive acceptable pollution thresholds lower, the ever present need for more efficient and cost-effective methods for reducing $NO_x$ emissions continues to increase.

Because a number of environmental problems, including acid rain, photochemical smog and tropospheric ozone (i.e., the greenhouse effect) have been attributed to the emission of nitrous oxides, governments have imposed ever stricter regulations on $NO_x$ emissions.

A major source of $NO_x$ emissions is the combustion of hydrocarbon fuels. Hydrocarbon fuels such as gas, oil and liquified coal are known to yield nitrous oxides during combustion. Emissions are especially high where the combustion occurs at higher temperatures and/or there is a large amount of fuel-bound nitrogen.

The components of nitrous oxides, nitrogen and oxygen, are inseparable from the process of fuel combustion. Combustion air comprises oxygen and nitrogen, and nitrogen is commonly found in the hydrocarbon fuel. As it is impractical, if not impossible, to prevent the formation of nitrous oxides by removing nitrogen from the reactants, one of two methods is commonly used to reduce or remove nitrous oxides during or after the reaction. First, nitrous oxides may be removed after the combustion process using selective catalytic or selective non-catalytic reduction. Second, the combustion process may be modified to minimize the formation of nitrous oxides, by employing staged combustion or low-$NO_x$ burners.

In a low-$NO_x$ burner, the formation of nitrous oxides during combustion can be mitigated by reducing the oxygen content in the combustion air (i.e., vitiation) and/or combusting the fuel and air at a lower temperature. By vitiating the oxygen content of the combustion air mixture, less excess oxygen is available in the combustion reaction for $NO_x$ formation. By minimizing the peak flame temperature, and the flame temperature generally, less excess energy is available for breaking stable nitrogen bonds and reforming oxygen-nitrogen bonds, a precursor to the formation of nitrous oxides. Both approaches are used to minimize the formation of $NO_x$ emissions.

The oxygen content of the combustion air can be vitiated, or diluted, with a gas lacking or low in oxygen. It is convenient and economical to re-circulate and mix the products of combustion, termed "flue gas" or "exhaust gas", with the combustion air to yield a combustible air mixture with a reduced oxygen content. The preferred oxygen content is determined on the basis of the fuel used or the desired temperature of the combustion reaction. As used herein, a mixture of combustion air, motive air and exhaust gas is also referred to as "vitiated combustion air" in connection with the present invention.

Many low $NO_x$ burners function by controlling the fuel and air mixture so as to create longer and more branched flames which provide a more consistent combustion temperature (i.e., an "even" burn) and lower minimum peak temperature. Where a vitiated combustible air mixture is employed, it is important that the combustion air and flue gas be mixed thoroughly so the oxygen in the mixture is evenly distributed. A thorough mixture allows the burners to better control the flame profile. As an added advantage, the production of unwanted waste products like carbon monoxide is also mitigated.

U.S. Pat. No. 4,828,483 discloses a regenerative burner which is intended to vitiate preheated combustion air with flue gas directly from a furnace. The lowered oxygen content of the combustion air is disclosed as helping to minimize the formation of nitrous oxides. The heat of the flue gas is used to preheat the combustion air, thus contributing to higher furnace efficiencies. This arrangement is directed, however, to a twin burner pair which draws flue gas directly from a furnace. Furthermore, it is not directed towards the use of a radiant tube burner assembly.

Although not relating to low-$NO_x$ burners, U.S. Pat. No. 4,359,209, describes the use of an air ejector, driven by a fan, to overcome pressure resistance and create a draw so that outside air flows, or are induced, into a plenum and to be mixed with hot flue gases. This mixture of flue gas and outside air is used to heat a recuperator which, in turn, preheats combustion air. In this instance, the combustion air is not vitiated. The problem of reducing nitrous oxides in a radiant tube burner assembly is not addressed.

The radiant tube burner of U.S. Pat. No. 4,800,866, employs a jet pump to provide combustion air and flue gas with a lowered oxygen content to the burners for reduction of $NO_x$ emission. The combustion air is forced into the recuperator by a fan. A stream of the total combustion air is accelerated through a nozzle to create a relatively negative pressure region around the nozzle to draw in flue gas returned to the exhaust leg by a connecting leg between the burner leg outlet and the recuperator inlet. This mixture is directed axially through a plenum towards the burner. The combustion air is preheated and then mixed with flue gases before entering the burner leg. This configuration, however, requires the use of all the forced combustion air to operate the jet pump and directs the forced combustion air and recirculated flue gas directly into the plenum. Such an arrangement does not provide sufficient time for the flue gas to mix throughly with the combustion air before reaching the burner leg, thereby presenting a potential problem of high CO levels. Furthermore this arrangement is only usable with forced combustion air systems.

SUMMARY OF THE INVENTION

Accordingly, an object of the present invention is to reduce the $NO_x$ emissions and other harmful waste products, particularly CO, from a radiant tube burner by vitiating to a sufficient extent the oxygen content of the air used for combustion and by allowing flue gas to be thoroughly mixed with the combustion air before combustion.

Another object of this invention is to achieve the benefit of reducing harmful $NO_x$ and other emissions such as CO while, at the same time, improving the thermal efficiency of the radiant tube burner.

A still further object is to provide a simple jet pump assembly which can be retrofitted onto existing radiant tube burners and which can be used with induced combustion air systems by the expedient of a compressed air supply which is almost always present in burner plants so as to operate the jet pump assembly.

The present invention achieves these and other objects by providing a method and apparatus for reducing the level of nitrous oxides and other waste pollutants produced from the combustion of hydrocarbon fuels in a radiant tube burner assembly and provides more uniform radiant tube temperature. In addition, the present invention improves the thermal efficiency of the burner assembly.

The apparatus of the present invention includes a burner assembly having burner and exhaust systems connected at opposite ends thereof by a radiant tube and a plenum, respectively. The burner section contains a burner and a fuel source. The exhaust section includes a recuperator. Combustion air is induced to enter the burner assembly through an inlet passage, and exhaust gas is exited through an outlet passage. A jet pump assembly is connected to the burner assembly to draw off exhaust flue gas and to recirculate the exhaust flue gas back into the stream of combustion air flowing through the burner assembly.

The combustion air which is induced to enter the burner assembly via an inlet in the exhaust section is directed through the plenum into the burner section. As the induced combustion air flows through the recuperator in the exhaust section, it is heated and is mixed with exhaust flue gas to form a combustion mixture. In the burner section, the combustion mixture is consumed along with fuel in a combustion reaction occurring at the burner. The combustion reaction yields hot flue gas which is directed through the radiant tube to radiate heat and which then flows into the exhaust section to be exhausted.

The jet pump assembly draws a small volume of exhaust flue gas from the burner assembly to be intermixed with the combustion air for the burner, thus vitiating the oxygen content of the combustion air. The jet pump assembly operates by using a small amount of compressed gas, termed "motive gas", to induce or draw the exhaust gas into and through the jet pump assembly and into the combustion air supply sufficiently upstream of the recuperator to promote mixing with the exhaust flue gas. Preferably, the motive gas is compressed air, and only a small amount of compressed air, e.g., between about 5 to 6% of the total air required for combustion is used. The compressed gas is typically at a pressure of 10 pounds per square inch gauge (psig). Sufficient flue gas is entrained by the motive air and injected into the combustion air to vitiate the oxygen percentage, preferably from 20.9 percent to approximately 19.0–19.5 percent.

The combustion air, motive gas and exhaust gas are sufficiently and thoroughly mixed prior to reaching the flame front of the burner in the burner section. Thereby, superior results are achieved in terms of CO emissions reduction.

The conventional recuperator in the exhaust section preheats the vitiated combustion air mixture prior to combustion. The recuperator absorbs heat from the hot exhaust gases flowing over its outer surface and transfers the heat to the incoming combustion air or combustion mixture. The use of a recuperator improves the thermal efficiency of the burner assembly as well as encourages a more uniform burn. Depending on the particular configuration, the recuperator may also improve the mixing of a combustion mixture.

The conventional burner section includes a fuel pipe and burner and a variety of staged air or staged fuel arrangements may be employed. Any conventional burner and fuel source may be employed. Details of conventional burner and exhaust section features need not be set forth herein to understand the present invention.

As above noted, the method of the present invention reduces nitrous oxides in the burner assembly by vitiating and reduces CO levels by thoroughly mixing the combustion air with exhaust gas. The vitiated combustion air may be preheated in the recuperator prior to combustion. Exhaust gas is drawn from the exhaust section, preferably from the exhaust outlet pipe, through a jet pump assembly and into the combustion air inlet via a motive gas and reduced pressure area. The motive gas, exhaust gas and combustion air are mixed prior to combustion in the burner section. The mixing of the motive gas, exhaust gas and combustion air may occurs in the combustion air inlet, the plenum, the exhaust section, the recuperator and/or the burner section. It is preferable to inject the motive and exhaust gases into the stream of combustion air upstream of the recuperator, providing for more thorough mixing. The mixture is then combusted in the burner section to yield heat and products of combustion, i.e., exhaust gas, which flow through the radiant tube into the exhaust section and then are exhausted out the exhaust section.

In the method of the present invention, recirculating exhaust or flue gas has been found to reduce nitrous oxides emissions by greater than 50% compared with a similar burner assembly in which exhaust gas was not recirculated to vitiate the oxygen content of the combustion air.

According to the present invention which in a burner assembly features a recuperator, the flue gas/motive gas mixture may be injected into the system at least at two separate points. The mixture may be injected into the burner assembly downstream of the recuperator, either into the plenum or directly into the burner assembly. Alternatively, the mixture may be injected into the combustion air prior to entering the recuperator or directly into the recuperator.

While the former method does reduce the nitrous oxide emissions, the level of another waste product, carbon monoxide, has been found to remain high. In contrast, the latter method reduces nitrous oxides and produces little or no carbon monoxide. The second method, in which flue gas is injected either upstream of or directly into the recuperator, is especially advantageous.

Yet another advantage of the present invention is that $NO_x$ emissions are greatly reduced with a concurrent improvement in radiant tube temperature uniformity. Also, by injecting the flue gas/motive gas mixture upstream of the recuperator, additional heat is extracted in the recuperator which provides a 3–4% better thermal efficiency. The use of a recuperator significantly lowers the exhaust gas temperature by the time it is exhausted, so in addition to preheating the combustion air, the exhausted flue or exhaust gas can be handled without requiring high temperature ductwork.

BRIEF DESCRIPTION OF THE DRAWINGS

Other objects, advantages and novel features of the present invention will become apparent from the following detailed description when considered in conjunction with the accompanying drawings, wherein.

DETAILED DESCRIPTION OF THE DRAWINGS

The invention is not limited to the details of the accompanying drawings and is capable of other embodiments and of being practiced or carried out in various ways commensurate with the claims herein. Also, the phraseology and terminology employed herein are for description and not to be construed as a limitation on the scope of our invention.

Figure 1:
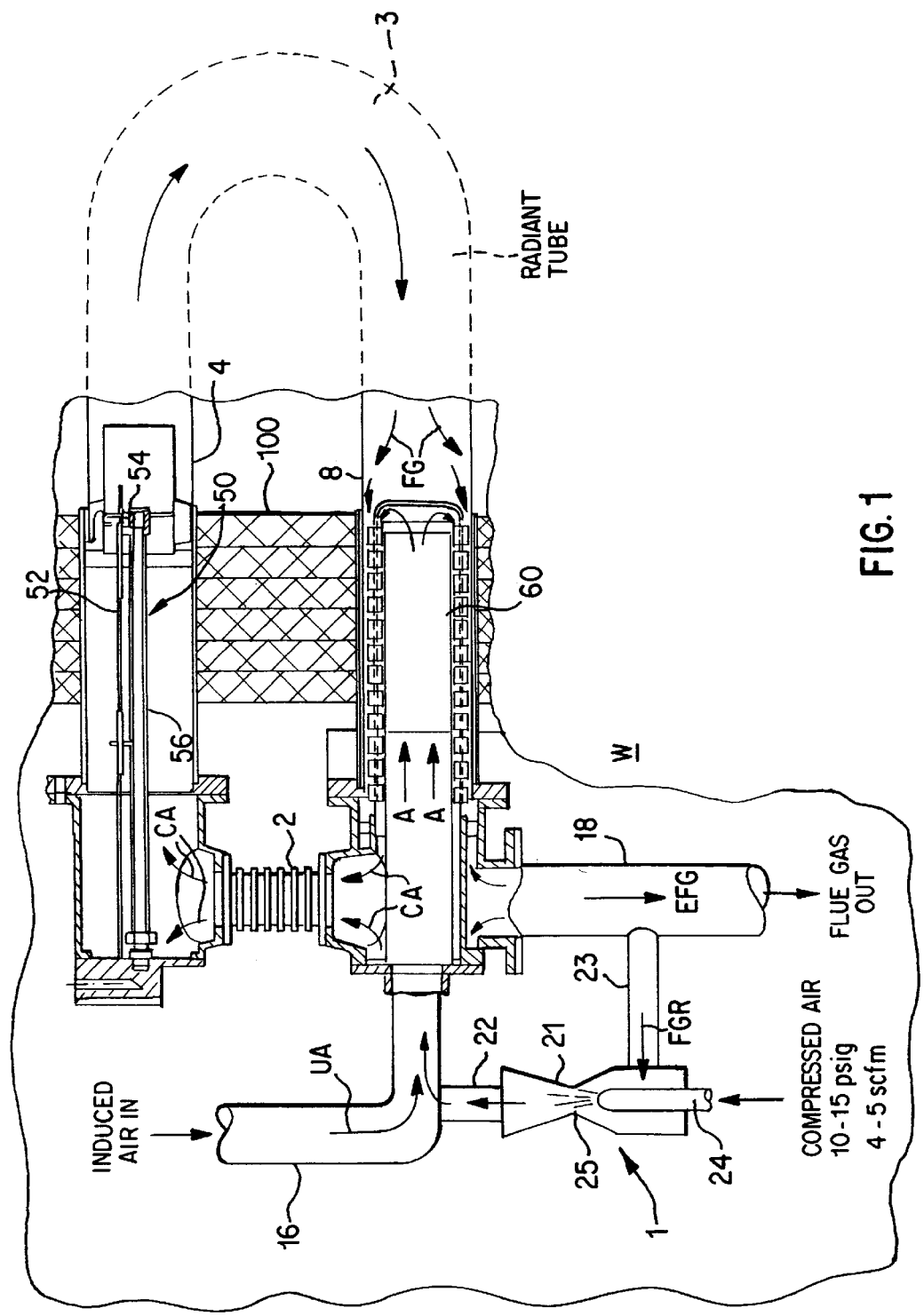
FIG. 1 is a side view of a currently preferred embodiment of a radiant tube burner and schematically shown jet pump assembly in which a recuperator is arranged in the exhaust section, with a burner casing broken away to illustrate the pertinent inner burner structure.

In FIG. 1, a preferred embodiment of the radiant tube burner and jet pump assembly designated generally by numeral 1 is illustrated. In the burner assembly 1, a burner section 4 and an exhaust section 8 extend through the furnace wall 100. Inside the furnace bounded by the wall 100, the burner section 4 and the exhaust section 8 are connected by a conventional radiant tube 3 shown partially in dashed-line where hidden by the burner housing casing W. On the opposite side of the furnace wall 100, the burner section 4 is connected to the exhaust section 8 by a plenum or duct 2.

Generally speaking, the radiant tube 3 depicted in FIG. 1 is of conventional construction. The present invention is thus not to be limited by the shape, size, style, construction or any other details of the radiant tube 3.

Contained within the burner section 4 is a conventional burner assembly 50 employing an ignitor 52 and fuel pipe 56. The burner 50 can also include a flame stabilizer 54 for uniformly distributing the combustion air mixture with the fuel and promoting flame stability with the creation of a partial vacuum between the air mixture and fuel. Those skilled in the art will further recognize that the present invention is not limited to the conventional burner depicted herein.

A recuperator 60 is located within exhaust section 8 to recover heat from hot exhaust flue gas shown by the arrows FG flowing over an outer surface thereof and to preheat the combustion air shown by arrows CA. The recuperator 60 is also of conventional construction, and thus the present invention is not to be limited by the shape, size, style, design construction or other details of the recuperator.

The exhaust outlet pipe 18 is connected to the exhaust section 8 and provides an exhaust passageway for exhaust or flue gas shown by arrow EFG. An air inlet pipe 16 is connected to the exhaust section 8 and provides an air passageway for unheated air UA to be induced at low pressure along with recirculated flue gas from the jet assembly described below into the recuperator 60 as shown by arrows A and then heated by the flue gas FG to form the combustion air CA.

A jet pump assembly comprises an inspirator 21 and pipe connectors 22, 23. The pipe connector 23 communicates the exhaust outlet pipe 18 with the input end of the inspirator 21 and the other pipe connector 22 communicates the air inlet pipe 16 with the output end of the inspirator 21 such that a portion of the exhaust flue gas EFG flowing through the exhaust outlet pipe 18 passes through the connector 23 to the inlet of the inspirator 21, the second connecting means 32 and then into air inlet pipe 16 to mix with the induced air UA.

The inspirator 21 also includes a compressed air supply pipe 24 for supplying a small amount of air at, for example, 10 to 15 psig and at 4 to 5 scfm. The inspirator 21 itself has a necked-down portion 25 forming a Venturi section as will be described more fully below with respect to FIGS. 4 and 5.

Figure 2A:
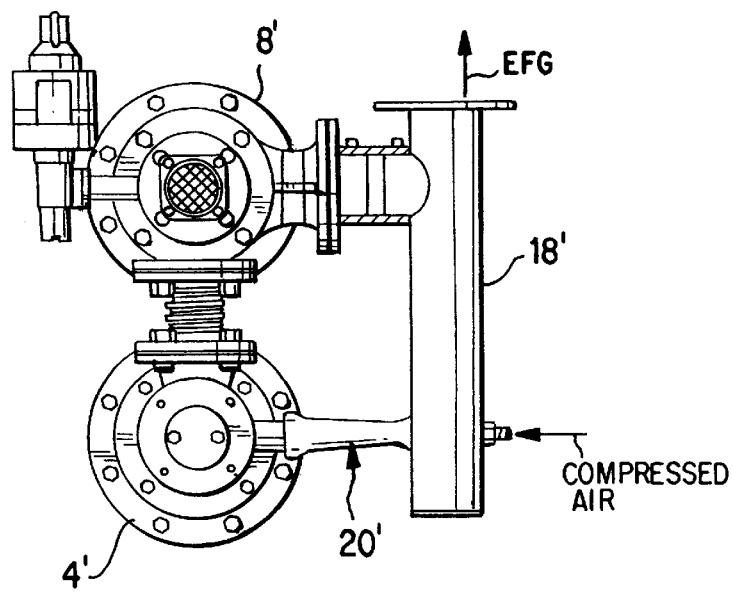
FIGS. 2a and 2b are a schematic front and side views, respectively, of a second preferred radiant tube burner assembly utilizing the present invention.
Figure 2B:
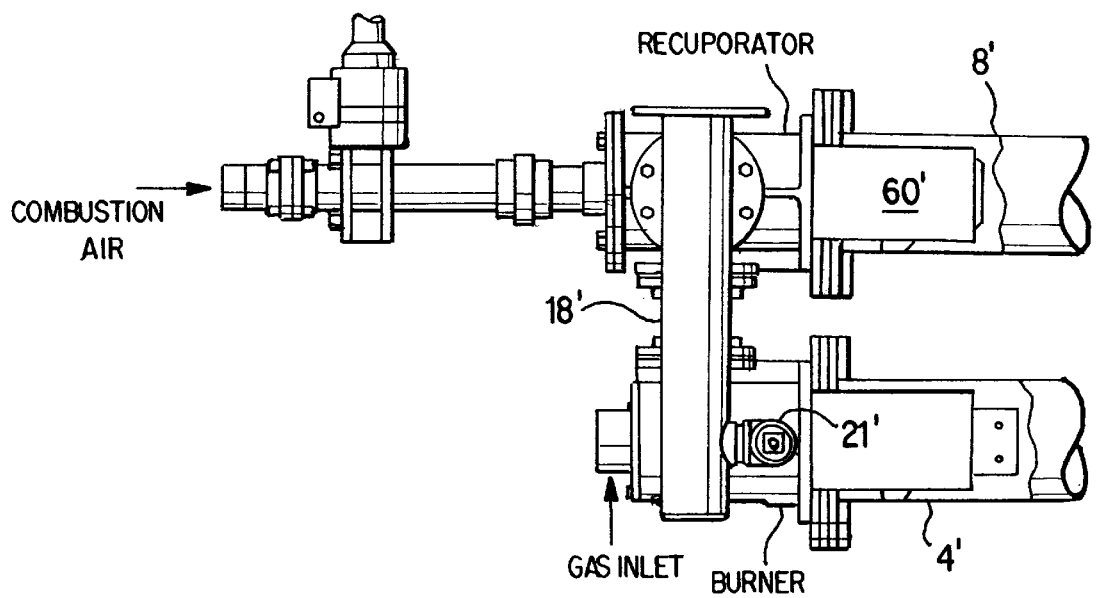

In the embodiment illustrated in FIGS. 2a and 2b, the exhaust outlet pipe 18' has a T-shaped configuration. A first leg of the exhaust outlet pipe receives flue gas from the burner assembly 4'. A second leg provides an exhaust for the flue gas. The jet pump assembly 20' is located within the third leg and draws a volume of the flue gas to be injected directly into the burner and downstream of the recuperator. In all other respects, the burner assembly functions the same as the assembly of FIG. 1 except that the point of injection of the vitiated air into the plenum does not provide sufficient time for mixing. Thus, higher than desired CO levels are experienced although $NO_x$ is reduced.

Figure 3A:
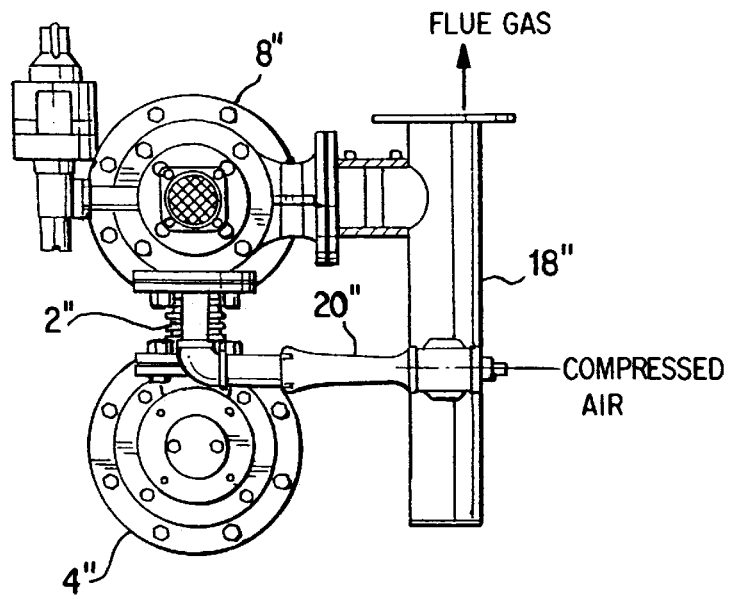
FIGS. 3a and 3b are front and side views, respectively, of an embodiment radiant tube burner assembly utilizing the present invention similar to that shown in FIG. 1.
Figure 3B:
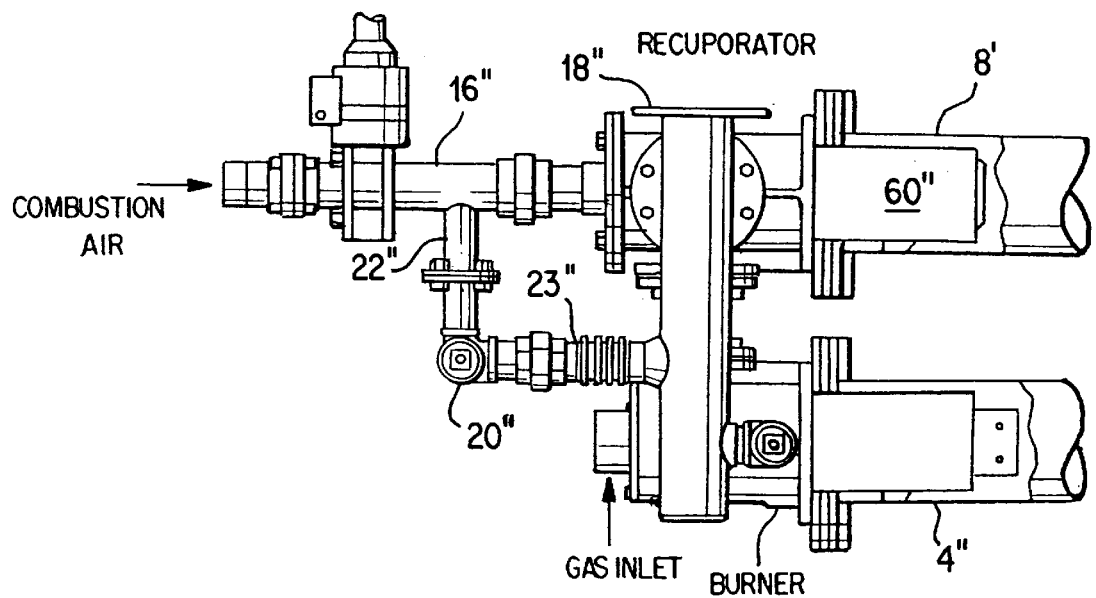

FIGS. 3a and 3b illustrate a burner assembly similar to that shown in FIG. 1 in that the jet pump assembly 20" of this embodiment injects the flue gas/motive gas mixture into the stream of combustion air and upstream of the recuperator 60" within the exhaust section 8".

Figure 4:
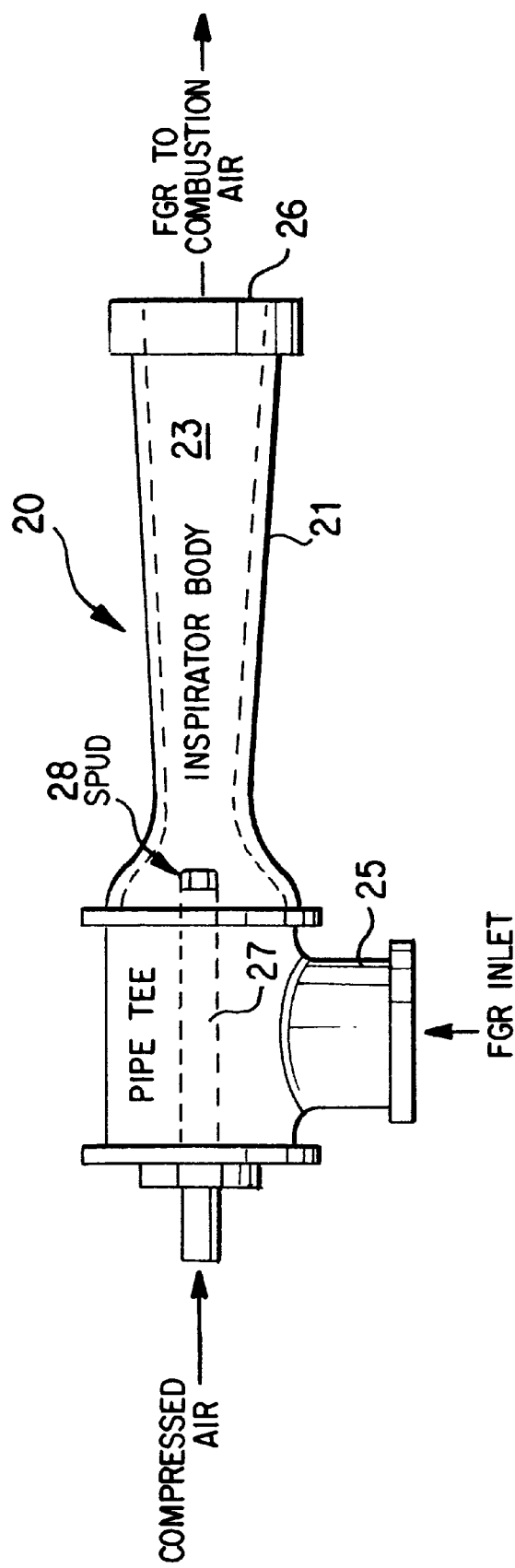
FIG. 4 is a side view of a currently preferred first of a jet pump for use in the burner assemblies shown in FIGS. 1–3b.

In FIG. 4, one embodiment of a conventional type jet pump assembly 20 for the systems illustrated in FIGS. 1–3b is shown. The inspirator 21 has an inspirator body 23 forming a necked-down passage 24, an inlet 25, an outlet 26 and an internal pipe 27. The inlet 25 connects the jet pump assembly 20 to an outlet pipe from the exhaust section 8, and the outlet 26 connects the assembly 20 to the second induced air inlet pipe. The pipe tee 27 extends through the inspirator body 23 into the passage 24 to direct a stream of small amount of compressed gas (e.g. air) towards the outlet 26 for entraining the flue gas to be recirculated.

When the compressed gas passes through the pipe tee 27, a reduced pressure area is formed in the Venturi passage 24 approximately adjacent to the inlet 25 so that a volume of the flue gas passing through exhaust outlet pipe 18 also flows into the passage 24.

A spud 28 may be attached to or formed in the end of the pipe tee 27 within the passage 24. The spud 28 restricts the cross-sectional area through which the compressed gas can flow and thereby increases the velocity of the compressed gas as it exits from the pipe tee 27.

In FIG. 5, the second embodiment of a conventional type jet pump 20''' is illustrated. The motive gas or compressed air 9 is fed into the inspirator 21''' via valve 40. A pressure gauge 45 can be used to monitor the pressure of compressed air entering the jet pump 20'''. An air shutter 42 is formed on the inspirator body 23''' and can be locked in position by a thumb-locking screw or the like.

The method of the present invention is now discussed with reference to FIGS. 1 and 4. In operation, compressed air is directed, for example, through the pipe tee 27 in FIG. 4 into the inspirator body 23 causing a reduced pressure area within the inspirator 21. Preferably, the compressed air is under pressure of approximately 10–15 psig, and has a flow rate of 4–5 scfm. Because of the reduced pressure area, a volume of the flue gas is drawn in from the exhaust outlet pipe 18 into the stream of the small amount of compressed air from a separate source. The motive gas and flue gas are directed from the inspirator via the into air inlet pipe 16. The flue gas is mixed with the compressed gas and this mixture is then mixed into the combustion air. The mixture of combustion air, motive gas and exhaust gas, or vitiated combustion air, then flows past the air inlet into exhaust section of the burner assembly.

As the vitiated combustion air flows through the recuperator 60 (FIG. 1), it is heated because the recuperator 60 transfers heat energy from the hot flue gas exhausted from the combustion reaction to the incoming mixture of the vitiated combustion air. The vitiated combustion air flows from the recuperator 60, through the plenum 2 and into the burner section 4 of the burner assembly. The preheated, vitiated combustion air 96 flows through the burner section 4 to the flame front where it is intermixed with fuel and combusted in a known way. The combustion reaction produces hot flue gas, which flows from the burner section 4 through the radiant tube 3 and into exhaust section 8. From there, the hot flue gas provides additional heat to the recuperator 60 and is exhausted from the exhaust section 8. The flue gas flows from the exhaust outlet 14 and through the exhaust outlet pipe 18 as waste gas. Some small percentage of the flue gas is recovered and used to vitiate the incoming combustion air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of reducing $NO_x$ formation in a radiant tube burner assembly having a burner section and an exhaust section, comprising the steps of:

(a) directing a stream of high-velocity motive gas through a jet pump assembly and thereby drawing into the jet pump assembly a portion of exhaust gas from the exhaust section of the burner assembly;

(b) forming a mixture by mixing combustion air, the quantity of exhaust gas, and the motive gas such that the oxygen content of the combustion air is vitiated, as the combustion air, the quantity of exhaust gas, and the motive gas are sufficiently mixed by being flowed into the exhaust section and into the burner section; and (c) combusting the mixture with fuel in the burner section, yielding exhaust gas which is flowed through the radiant tube into the exhaust section whereby $NO_x$ and CO emission levels are substantially reduced.

2. The method of claim 1, further comprising the step of:
    preheating the mixture in a recuperator, the recuperator located within the exhaust section, prior to flowing the mixture into the plenum and the burner section, where the recuperator transfers to the mixture heat absorbed from hot exhaust gas.

3. The method of claim 1, wherein the mixture has an oxygen content of approximately no more than 19.5 percent.

4. The method of claim 1, wherein the motive gas is comprised of compressed air.

5. A flue recirculation radiant tube burner assembly, comprising a burner, a recuperator, a plenum for connecting an outlet of the recuperator with an inlet of the burner, a radiant tube connecting an outlet of the burner with an inlet of the recuperator to produce radiant heat at a desired location; an induced air supply associated with the inlet of the recuperator, to mix induced air and exhausted flue gas; and a compressed-air actuated jet assembly located externally of the burner and recuperator to induce flow of flue gas to the air supply at a location sufficient upstream of the recuperator to minimize $NO_x$ and CO emissions in the flue gas.

6. A radiant tube burner assembly, comprising:

(a) a burner section, an exhaust section, and a radiant tube, the radiant tube connecting a first end of the burner section to a first end of the exhaust section, the burner section containing a burner for combusting a fuel and thereby producing an exhaust gas, and the exhaust section containing a recuperator;

(b) a plenum connecting a second end of the exhaust section to a second end of the burner section;

(c) a combustion air inlet for providing a first passageway through which combustion air is induced to enter the burner assembly, (d) an exhaust gas outlet for providing a second passageway through which the exhaust gas may exit the burner assembly;

(e) a fuel source directed into the burner section for providing combustion fuel;

(f) a first pathway formed in the burner assembly for directing a combustion mixture to a combustion area within the burner section, (g) and a second pathway formed in the burner assembly for directing the exhaust gas through the radiant tube and out of the burner assembly; and (h) a jet pump assembly located externally of the burner section and of exhaust section for drawing in a portion of the exhaust gas and flowing the portion into the induced combustion air via a motive gas, the jet pump assembly being operatively connected to the burner assembly so that the exhaust gas is drawn into the jet pump assembly from the second pathway and to the burner assembly such that during operation the motive gas and the exhaust gas flow from the jet pump assembly into the combustion air flowing in the first pathway, and a combustion mixture is formed and is comprised of the exhaust gas, the combustion air and the motive gas;

whereby, during normal operation, the oxygen content of the combustion air is vitiated by at least the quantity of flue gas to reduce $NO_x$ and and the vitiated combustion air is sufficiently mixed prior to combustion to reduce CO emission levels.

7. The burner assembly of claim 6, wherein the first pathway of the burner assembly is connected upstream of the recuperator.

8. The burner assembly of claim 6, wherein the first pathway of the burner assembly is connected downstream of the recuperator.

9. The burner assembly of claim 6, wherein the first pathway of the burner assembly is connected inside of the recuperator.

10. The burner assembly of claim 6, wherein the motive gas is compressed air.

11. The burner assembly of claim 6, wherein the burner section comprises a fuel pipe, an ignitor and a flame stabilizer.

12. The burner assembly of claim 6, wherein the jet pump assembly compress an inspirator having a body defining an internal passage with a Venturi section, an inlet, an outlet, and a pipe tee, extending into the body in a direction of the outlet, whereby the motive gas flowing through the pipe tee into the internal chamber creates a reduced pressure in the passage.

13. The burner assembly of claim 12, wherein the internal chamber of the inspirator includes a restricted Venturi portion for produced the reduced pressure.

* * * * *